(12) United States Patent
Lippert et al.

(10) Patent No.: US 7,488,371 B2
(45) Date of Patent: Feb. 10, 2009

(54) DEGASSING DEVICE FOR DEGASSING MATRIX MATERIAL IN ORDER TO PRODUCE FIBER-REINFORCED COMPONENTS

(75) Inventors: Thomas Lippert, Augsburg (DE); Hans-Wolfgang Schröder, Immenstaad (DE); Franz Stadler, Böhmfeld (DE); Stefan Utecht, Kaufering (DE)

(73) Assignee: EADS Deutschland GmbH, Ottobrunn (DE)

( * ) Notice: Subject to any disclaimer, the term of this patent is extended or adjusted under 35 U.S.C. 154(b) by 922 days.

(21) Appl. No.: 10/902,091

(22) Filed: Jul. 30, 2004

(65) Prior Publication Data

US 2005/0034603 A1    Feb. 17, 2005

Related U.S. Application Data

(63) Continuation of application No. PCT/DE03/00178, filed on Jan. 23, 2003.

(30) Foreign Application Priority Data

Jan. 31, 2002    (DE)    ................... 102 03 976

(51) Int. Cl.
*B01D 19/00* (2006.01)
(52) U.S. Cl. ............ 95/45; 95/266; 96/6; 96/193
(58) Field of Classification Search ............ 95/45, 95/266; 96/6, 193
See application file for complete search history.

(56) References Cited

U.S. PATENT DOCUMENTS

| 4,256,444 | A |   | 3/1981 | Suter |
| 5,860,737 | A | * | 1/1999 | Hauser ............ 366/139 |
| 2002/0020934 | A1 |   | 2/2002 | Hinz |
| 2003/0011094 | A1 | * | 1/2003 | Filsinger et al. ....... 264/102 |

FOREIGN PATENT DOCUMENTS

| DE | 10013409 | 11/2000 |
| EP | 1038656 | 9/2000 |
| EP | 1136238 | 9/2001 |

* cited by examiner

*Primary Examiner*—Duane S Smith
*Assistant Examiner*—Douglas J Theisen
(74) *Attorney, Agent, or Firm*—Greenblum & Bernstein, P.L.C.

(57) ABSTRACT

Degassing device for degassing matrix material in the manufacture of fiber-composite components with a support device, a distribution fabric, a gate device, a discharge device, a matrix-material-impermeable barrier layer, which is sealed with respect to the support device by a seal and thus forms a first chamber of the degassing device located around the gate device, as well as a degassing device for degassing matrix material in the manufacture of fiber-composite components with a first connection, for conducting the matrix material to be degassed into the degassing device, a second connection for conducting the degassed fluid out of the same, and a third connection for applying negative pressure to the interior of the same, an inner body, a resin-impermeable and air-permeable film, and an outer housing.

22 Claims, 3 Drawing Sheets

DEGASSING DEVICE FOR DEGASSING MATRIX MATERIAL IN ORDER TO PRODUCE FIBER-REINFORCED COMPONENTS

CROSS-REFERENCE TO RELATED APPLICATIONS

The present application is a continuation of International Patent Application No. PCT/DE03/00178, filed Jan. 23, 2003, and claims priority under 35 U.S.C. § 119 of German Patent Application No. 102 03 976.3, filed on Jan. 31, 2002. Moreover, the disclosure of International Patent Application No. PCT/DE03/00178, is expressly incorporated by reference herein in its entirety.

BACKGROUND OF THE INVENTION

1. Field of the Invention

The present invention relates to a degassing device for degassing matrix material in the manufacture of fiber-composite components.

2. Discussion of Background Information

In the manufacture of fiber-composite components, hereinafter referred to as FC components, using resin injection methods, pores may be formed as a result of gas bubbles, dissolved gases, and other volatile constituents contained in the matrix material. As a result, the quality of the components is reduced, which can cause the FC components to be unusable.

Described in German patent No. DE 100 13 409 C1 is a device and a process for manufacturing fiber-reinforced plastic components from dry fiber-composite semifinished products using an injection method for injecting matrix material with a gas-permeable and matrix-material-impermeable membrane, which is arranged around the semifinished product on at least one side and forms a first space and into which matrix material can be introduced, having a flow promoter arranged on a surface of the semifinished product, having a second space, sealed with respect to a tool, adjacent to the first space, which is delimited from the surroundings by a gas-impermeable and matrix-material-impermeable film, wherein when air is removed from the second space by suction, matrix material is drawn from the reservoir into the evacuated first space and the flow promoter causes distribution of the matrix material over the surface of the semifinished product facing it and penetration thereof vertically into the semifinished product.

In this process, the matrix material is distributed by a flow promoter over the fiber-composite semifinished product, and from there penetrates the semifinished product. The flow promoter is delimited on one side by the gas-permeable and matrix-material-impermeable membrane. During transport of the matrix material in the thin flow promoter, degassing of the matrix material takes place. The degassing takes place through the membrane adjoining the flow promoter into the evacuated second chamber. For efficacious degassing, it is necessary for the matrix material to first be able to travel an adequately long distance through the flow promoter before it enters the semifinished product.

In the commonly used gate arrangements for introducing the matrix material into the flow promoter, such film degassing does not occur directly beneath the gates, and occurs only incompletely in the areas directly adjacent thereto. Accordingly, the probability is greater beneath the gates and in the areas adjacent thereto that pore formation will take place there.

Another disadvantage of this process resides in that the use of two chambers which requires greater expenditure of auxiliary materials for the membrane as compared to the single-chamber principle likewise known in fiber composite technology.

In addition, degassing of the matrix material can take place according to a method known from the general prior art wherein the matrix material is remelted into a thin layer (film) in an evacuated space. In general, the thinner the matrix material layer to be degassed, the more effective such a degassing process is. This process for degassing the matrix material, which is also called film degassing, has the following disadvantages. For example, the additional degassing step is unfavorable with regard to costs and additional inputs; the matrix material must be heated for the degassing step and this causes aging processes to occur; the matrix material can again absorb volatile constituents, such as water vapor from the air, prior to later processing to produce fiber-composite components; and the matrix material can react with auxiliary materials during the course of the injection process, with the formation of gas. Thus, reactions with low-cost, flexible silicone profiles for gates have been observed.

SUMMARY OF THE INVENTION

It is an aspect of the present invention to provide methods and devices for the manufacture of FC components in which or with which advantageous degassing of matrix material occurs during the manufacture of FC components.

In one aspect of the present invention, a degassing device for degassing of matrix material is provided for the manufacture of fiber-composite components. The device includes a gate device which in each case is arranged on a support device for conducting the matrix material to be degassed into the degassing device. The device further includes a discharge device, a distribution fabric, and a matrix-material-impermeable and gas-permeable layer which is sealed with respect to the support device by a seal to form a first chamber surrounding the gate device and the discharge device, over which is placed a venting fabric. Moreover, the device includes a film surrounding the layer and sealed with respect to the support device to form a second chamber and a vacuum connection that communicates with the second chamber for degassing the matrix material in the degassing device. Additionally, the gate device and/or the discharge device can be integrated in the support device. The barrier layer can be a film or panel. Moreover, the layer can be realized with a PTFE film, an adhesive, and/or a backing fabric, or in the form of a sandwich construction made from these materials.

In another aspect of the present invention, a degassing device for degassing of matrix material is provided for the manufacture of fiber-composite components. The device including an inner body, with an outer container surrounding this and a matrix-material-impermeable and gas-permeable film arranged between them to form a first space between the film and the inner body and a second space between the film and the outer container. The film is held by an intermediate layer. The device further including a first connection for conducting the matrix material to be degassed into the first space, a connection for conducting the degassed matrix material out of the same, and a connection for applying negative pressure to the first space. Moreover the surface of the inner body can be equipped with grooves. Additionally, the grooves on the surface of the inner body can run in an elongated or spiral direction, viewed in its longitudinal direction. The intermediate layer can be made of a gas-permeable ceramic. Additionally, the intermediate layer can be made of a perforated plate.

In another aspect of the present invention, a degassing device for degassing matrix material in the manufacture of fiber-composite components includes a gate device, arranged on a support device, that conducts the matrix material to be degassed, a discharge device, a distribution fabric, a venting fabric, a matrix-material-impermeable and gas-permeable barrier layer, a seal arranged to seal the barrier layer to the support device to form a first chamber surrounding the gate device and the discharge device and includes the venting fabric, a film surrounding the gas-permeable layer and sealed with respect to the support device to form a second chamber, and a vacuum connection that communicates with the second chamber that degasses the matrix material. Moreover, the gate device or the discharge device can be integrated in the support device. Additionally, the barrier layer can be a film or panel. Also, the barrier layer can be formed of a PTFE film, an adhesive, a backing fabric, or a sandwich construction made from the PTFE film, the adhesive, and the backing fabric.

Yet another aspect of the present invention includes a degassing device for degassing matrix material in the manufacture of fiber-composite components that includes an inner body and an outer container surrounding the inner body, a matrix-material-impermeable and gas-permeable film arranged between the inner body and the outer container to form a first space between the film and the inner body and a second space between the film and the outer container, a first connection that conducts the matrix material to be degassed into the first space, a second connection that conducts the degassed matrix material out of the first space, a third connection that applies a negative pressure to the first space, and an intermediate layer structured and arranged to hold the film. The inner body can include grooves. Moreover, the grooves on the surface of the inner body extend in an elongated or spiral direction. Also, the intermediate layer can be made of a gas-permeable ceramic material. Moreover, the intermediate layer can be made of a perforated plate.

One other aspect of the present invention includes a degassing device for degassing matrix material in the manufacture of fiber-composite components with a support device that includes a first chamber including a distribution fabric, the gate device, a discharge device, and a matrix-material-impermeable barrier layer that is sealed with respect to the support device by a seal, a venting fabric positioned above the barrier layer, a film arranged to surround the venting fabric to form a second chamber. The venting fabric is structured and arranged to evacuate the first chamber to degas the matrix material through a vacuum connection communicating with the second chamber. Additionally, at least one of the gate device or the discharge device can be integrated in the support device. Also, the barrier layer can be gas-impermeable. The barrier layer can be a film or panel.

Moreover, the barrier layer can be formed of a PTFE film, an adhesive, a backing fabric, or a sandwich construction made from the PTFE film, the adhesive, and the backing fabric.

Another aspect of the present invention is directed to a degassing device for degassing matrix material in the manufacture of fiber-composite components that includes a first connection that introduces the matrix material to be degassed, a second connection that removes the degassed matrix material, a third connection that applies negative pressure, an inner body, an outer housing, and a resin-impermeable and air-permeable film arranged between the inner body and the outer housing.

In one aspect of the present invention a degassing device that degasses matrix material in the manufacture of fiber-composite components includes a first chamber located adjacent to a gate device, a venting fabric that is surrounded by a film to form a second chamber that evacuates the degassing device, a vacuum connection that communicates with the second chamber and that degasses the matrix material. Moreover, the first chamber can further comprise a distribution fabric, the gate device, a discharge device, and a matrix-material-impermeable barrier layer that is sealed with respect to a support device by a seal. Moreover, at least one of the gate device or the discharge device can be integrated in the support device. Additionally, the barrier layer is gas-impermeable. Also, the barrier layer is a film or panel. Furthermore, the barrier layer can be formed of a PTFE film, an adhesive, a backing fabric, or a sandwich construction made from the PTFE film, the adhesive, and the backing fabric.

Another aspect of the present invention is a method of degassing matrix material in the manufacture of fiber-composite components that includes introducing the matrix material to be degassed into a degassing device through a first connection, removing the degassed matrix material out of the degassing device through a second connection, and forming negative pressure in an interior of the degassing device through a third connection. Furthermore, the degassing device can further comprise an inner body, a resin-impermeable and air-permeable film, and an outer housing.

The present invention may be implemented in combination with the device and/or the method from German patent No. DE 100 13 409 C1 or with other devices or methods from the prior art in which resin or matrix material is introduced into a structure with fiber-composite semifinished products for infiltration into the same. The devices in accordance with the present invention are provided in order to degas the supplied resin or matrix material.

DETAILED DESCRIPTION OF THE PRESENT INVENTION

Figure 2:
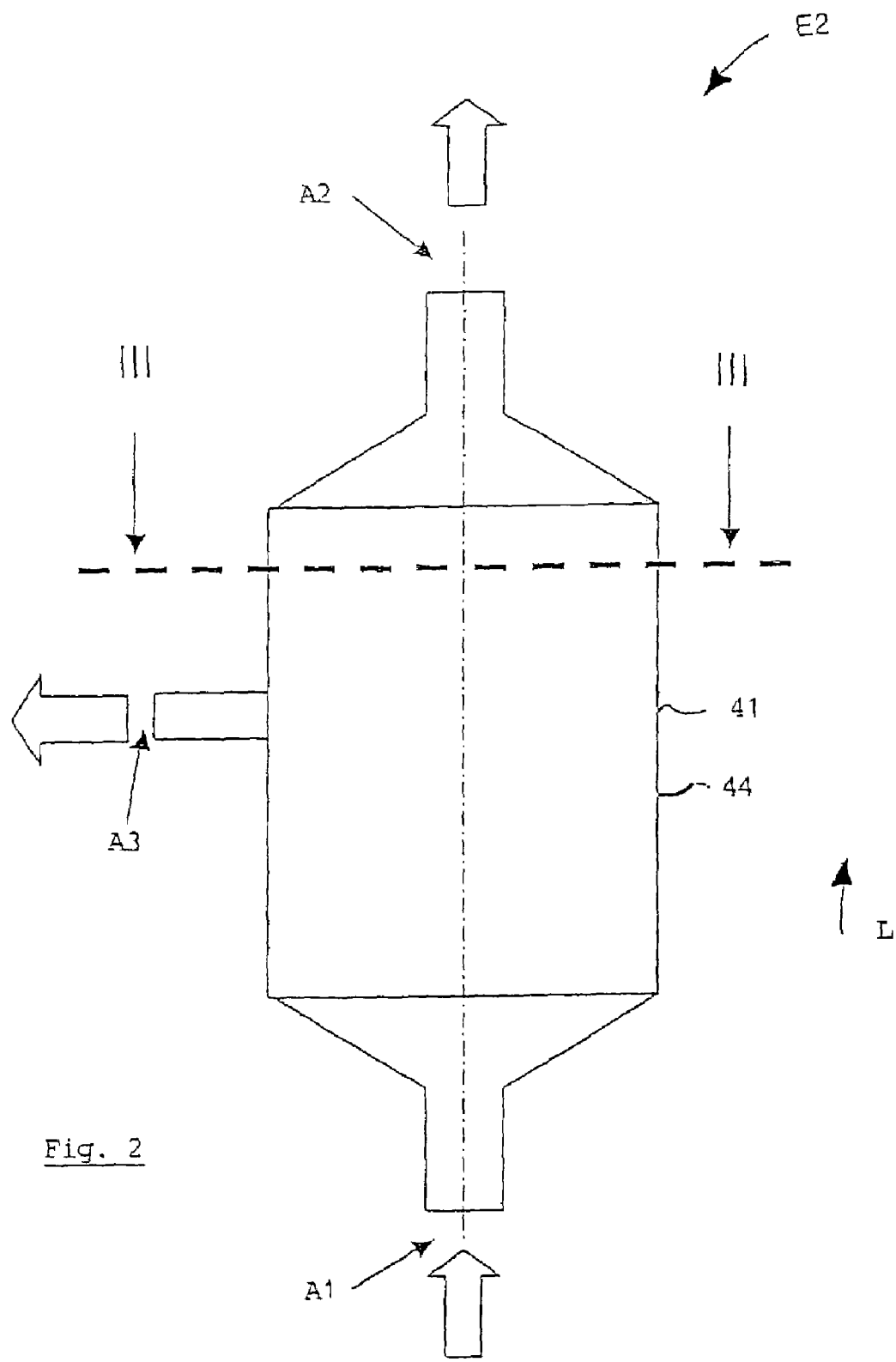
FIG. 2 shows another embodiment of the degassing device in accordance with the present invention, which likewise works together with a single-chamber or dual-chamber injection structure.
Figure 3:
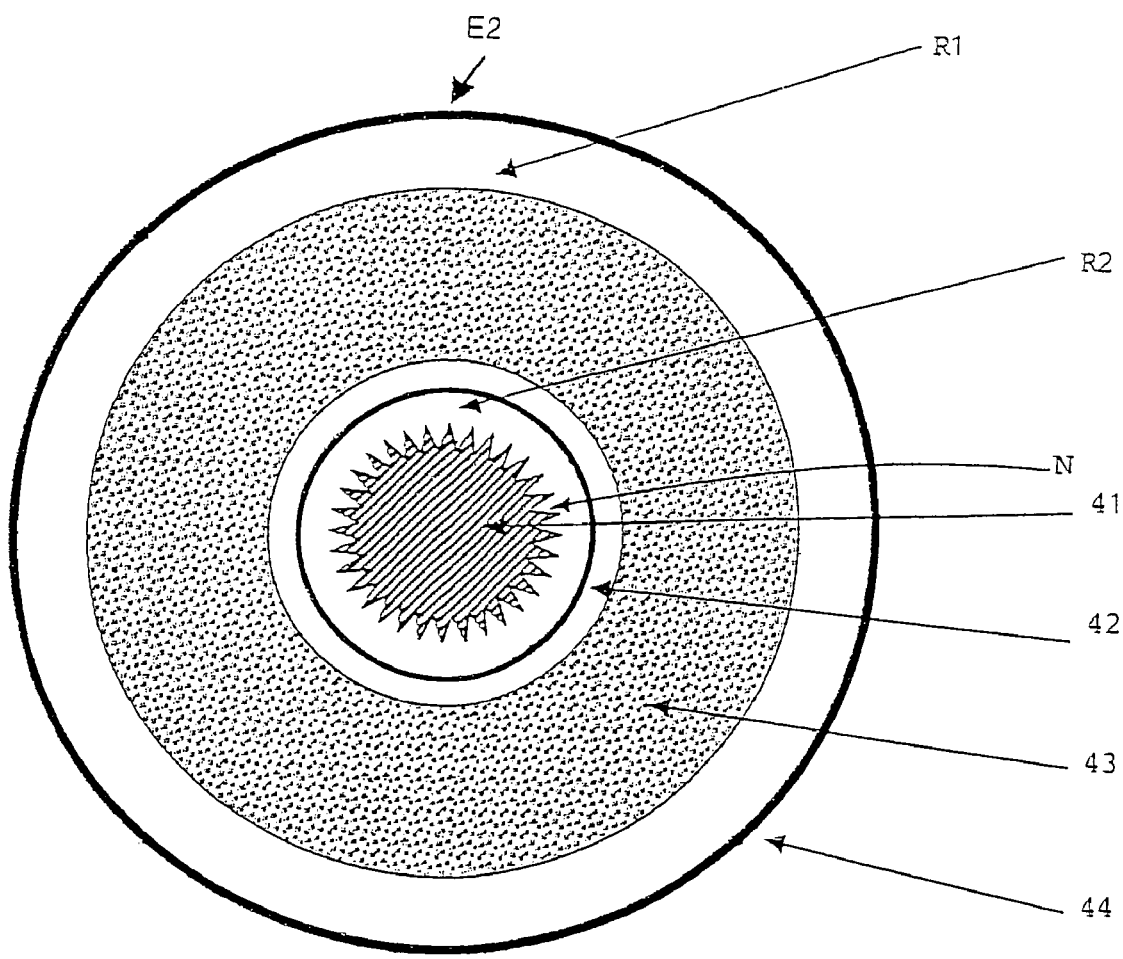
FIG. 3 shows a cross-section along line III-III through the embodiment from FIG. 2.

In accordance with the present invention, a degassing device for the matrix material used in the manufacture of FC components is provided that is arranged separately from the FC manufacturing device. The matrix material, which is generally a fluid, is thus degassed in a degassing device that is separate from the FC manufacturing device (FIGS. 1 to 3).

In this context, material referred to as textile fabric is understood to be a dry or pretreated fiber-composite fabric or fiber-composite nonwoven fabric from which a fiber-composite component can be manufactured after resin infiltration and after treatment in an autoclave.

Figure 1:
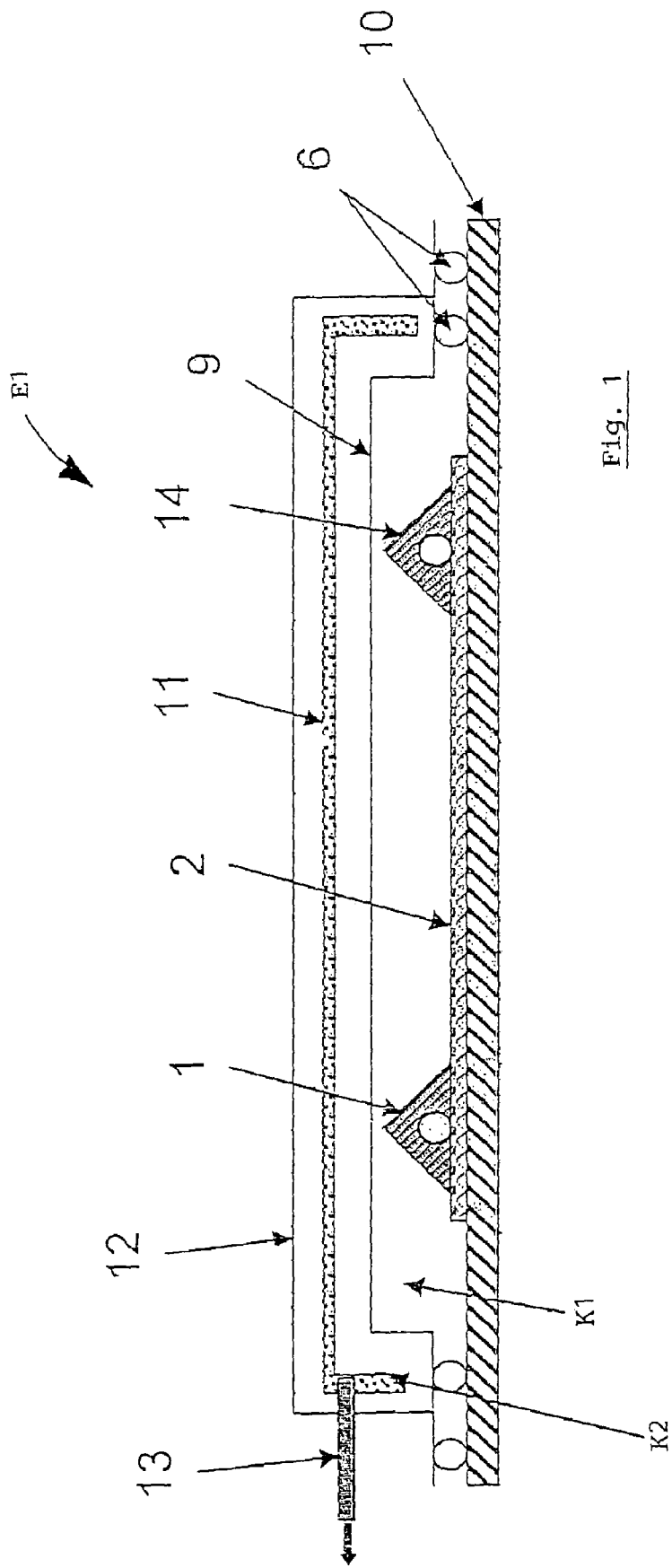
FIG. 1 shows an embodiment of the degassing device in accordance with the present invention, which works together with a single-chamber or dual-chamber injection structure.

An exemplary embodiment of the degassing device in accordance with the present invention for a degassing of the matrix material or resin in advance of an injection process for fiber-composite component manufacture is shown in FIG. 1. The injection process may be a single-chamber or multi-chamber process. A multi-chamber process is described in German Patent No. DE 100 13 409 C1. A single-chamber process is described in European Patent Application No. EP 1 136 238 A2, for example. Advance degassing is especially necessary in a single-chamber process, since integrated degassing is not possible because of the lack of a second chamber.

The degassing device in accordance with the present invention is placed in advance of the actual injection device in such a manner that the matrix material must flow through the degassing device on the way from the supply to the injection device. The principle of operation of the advance degassing device is based on the fact that the matrix material passes through a dual-chamber system in such a way that the gas bubbles, dissolved gases, and other volatile constituents contained can be drawn off during the process.

FIG. 1 shows a first embodiment of the degassing device E1 in accordance with the present invention. It comprises a support device 10, which may also be a mold; a spacer or a distribution fabric 2, which may also be a flow promoter; a gate runner or a gate device 1 and a discharge device 14, which both may be pipe openings and also integrated in the support device 10; a matrix-material-impermeable layer or barrier layer 9, which is sealed with respect to the support device 10 by a seal or a sealing strip 6, and thus forms a first chamber K1 of the degassing device E1 located around the gate device.

The barrier layer 9 can be formed by a PTFE film, an adhesive, and/or a backing fabric, or in the form of a sandwich construction made from these materials. The matrix-material-impermeable layer or barrier layer 9 may take the form of a film or panel. The barrier layer 9 is designed gas-permeable.

Located above the barrier layer 9 is a venting fabric or exhaust fabric 11, which is formed in accordance with the prior art. Viewed in relation to the support device 10, a film 12 is arranged over the barrier layer 9 and the venting fabric 11, which film is sealed with respect to the support device 10 by a seal 6. In this way, the film 12 and the barrier layer 9 together form a second chamber K2 of the degassing device. The degassing device E1 is evacuated by a vacuum connection 13, which communicates with the second chamber K2.

The degassing process proceeds as follows: the matrix material enters the degassing device E1 through the gate device 1. From there, the matrix material flows into the distribution fabric or the spacer 2. While the matrix material flows through this spacer 2, the gas bubbles, dissolved gases, and other volatile constituents contained in the matrix material are drawn off through the semi-permeable film 9 when negative pressure is applied by the vacuum connection 13. Thereafter the degassed matrix material flows through the discharge device 14 to the structure with the fiber-composite semifinished product, which is to say to the actual injection process.

Another exemplary embodiment of the degassing device in accordance with the present invention is shown in FIGS. 2 and 3.

The device has a first connection A1, with which the fluid or matrix material to be degassed is conducted into the degassing device, a second connection A2 for conducting the degassed fluid out of the degassing device, and a third connection A3 for applying negative pressure or vacuum to the interior of the degassing device.

The degassing device E2 shown in FIGS. 2 and 3 has an inner body 41. The latter preferably is equipped with grooves N on its surface. Viewed in the longitudinal direction L, they may more particularly be elongated or spiral in design. The design of the grooves N depends on the desired dwell time of the matrix material.

The degassing device E2 further has a resin-impermeable and air-permeable film 42. This permits a degassing process after the application of negative pressure by the vacuum connection A3. The device separates a first space R1 surrounding the film 42 from a second space R2 located in the interior of the film 42.

The first space R1 is surrounded by an absorption device or intermediate layer 43. This is attached to the film 42 in order to serve as a carrier for it. It can be made of a gas-permeable ceramic or a perforated plate. Its function is oriented toward the exchange of the gas of the matrix material due to negative pressure.

The degassing device E2 further has an outer container or a housing 44. The size of the outer housing 44 depends on the quantity of resin to be degassed.

The body or the housing 41 and 44, respectively, may have any even or irregular shape. These may also be flexible in design. The shape or the material is determined by the application. In particular, they may have a cylindrical form.

Shown in FIG. 3 is a cross-section of the degassing device E2. The first space R1 is formed by the outer container 44 and the film 42. This space is evacuated by the vacuum connection A3, causing the undegassed fluid (matrix material) to flow through the opening A1 into the degassing device. As a result of the application of negative pressure, a negative pressure differential exists between the first space R1 and the second space R2, where the negative pressure in the first space R1 is greater than the negative pressure in the second space R2.

The mode of operation of the degassing device E2 is as follows. The first space R1 is evacuated by the vacuum connection A3 and the device is brought between an injection pipe (matrix pipe). The undegassed fluid (matrix material) flows through the opening A1 into the device. It must now flow over the body 41 and over the film 42. A pressure differential exists between space R1 and space R2. Negative pressure space R1 is greater than negative pressure space R2. The gas contained in the fluid (matrix material) is now released out of the fluid because of the pressure differential. The semi-permeable film 42 makes it possible for the gas to enter the space R1. After the degassing, the degassed fluid flows through opening A2.

The physical relationships here are:

| Connection A1: | pressure state: $P_{fluid\ inlet}$ |
| Connection A2: | pressure state: $P_{fluid\ outlet}$ |
| Vacuum connection A3: | pressure state: $P_{vacuum}$ | the following apply:

$$P_{vacuum} < P_{fluid\ outlet} < P_{fluid\ outlet} \quad (1)$$

$$P_{vacuum} \leq P_{fluid\ vapor\ pressure} \quad (2)$$

What is claimed:

1. A degassing device for degassing matrix material in the manufacture of fiber-composite components, the device comprising:
    a gate device, arranged on a support device, that conducts the matrix material to be degassed;
    a discharge device;
    a distribution fabric;
    a venting fabric;

a matrix-material-impermeable and gas-permeable barrier layer;
a seal arranged to seal the barrier layer to the support device to form a first chamber surrounding the gate device and the discharge device;
a film surrounding the venting fabric and the gas-permeable layer and sealed with respect to the support device to form a second chamber; and
a vacuum connection that communicates with the second chamber that degasses the matrix material.

2. The degassing device according to claim 1 wherein one of the gate device or the discharge device are integrated in the support device.

3. The degassing device according to claim 1 wherein the barrier layer is a film or panel.

4. The degassing according to claim 1 wherein the barrier layer is formed of a PTFE film, an adhesive, a backing fabric, or a sandwich construction made from the PTFE film, the adhesive, and the backing fabric.

5. A degassing device for degassing matrix material in the manufacture of fiber-composite components, the device comprising:
an inner body and an outer container surrounding the inner body;
a matrix-material-impermeable and gas-permeable film arranged between the inner body and the outer container to form a space between the film and the inner body and another space between the film and the outer container;
a first connection that conducts the matrix material to be degassed into the space;
a second connection that conducts the degassed matrix material out of the space;
a third connection that applies a negative pressure to another space; and
an intermediate layer structured and arranged to hold the film.

6. The degassing device according to claim 5, wherein the surface of the inner body includes grooves.

7. The degassing device according to claim 6, wherein the grooves on the surface of the inner body extend in an elongated or spiral direction.

8. The degassing device according to claim 5 wherein the intermediate layer is made of a gas-permeable ceramic material.

9. The degassing according to claim 5, wherein the intermediate layer is made of a perforated plate.

10. A degassing device for degassing matrix material in the manufacture of fiber-composite components with a support device, the degassing device comprising:
a first chamber including a distribution fabric, a gate device, a discharge device, and a matrix-material-impermeable barrier layer that is sealed with respect to the support device by a seal;
a venting fabric positioned above the barrier layer;
a film arranged to surround the venting fabric to form a second chamber;
wherein the venting fabric is structured and arranged to evacuate the first chamber to degass the matrix material through a vacuum connection communicating with the second chamber.

11. The degassing device according to claim 10, wherein at least one of the gate device or the discharge device are integrated in the support device.

12. The degassing device according to claim 10 wherein the barrier layer is gas-permeable.

13. The degassing device according to claim 10 wherein the barrier layer is a film or panel.

14. The degassing device according to claim 10 wherein the barrier layer is formed of a PTFE film, an adhesive, a backing fabric, or a sandwich construction made from the PTFE film, the adhesive, and the backing fabric.

15. A degassing device for degassing matrix material in the manufacture of fiber-composite components, the device comprising:
a first connection that introduces the matrix material to be degassed;
a second connection that removes the degassed matrix material;
a third connection that applies negative pressure;
an inner body;
an outer housing; and
a resin-impermeable and air-permeable film arranged between the inner body and the outer housing.

16. A degassing device that degasses matrix material in the manufacture of fiber-composite components, the device comprising:
a first chamber surrounding a gate device;
a venting fabric that is surrounded by a film to form a second chamber that evacuates the degassing device;
a vacuum connection that communicates with the second chamber and that degasses the matrix material.

17. The degassing device according to claim 16 wherein the first chamber further comprises a distribution fabric, the gate device, a discharge device, and a matrix-material-impermeable barrier layer that is sealed with respect to a support device by a seal.

18. The degassing device according to claim 17 wherein at least one of the gate device or the discharge device are integrated in the support device.

19. The degassing device according to claim 17 wherein the barrier layer is gas-permeable.

20. The degassing device according to claim 17 wherein the barrier layer is a film or panel.

21. The degassing device according to claim 17 wherein the barrier layer is formed of a PTFE film, an adhesive, a backing fabric, or a sandwich construction made from the PTFE film, the adhesive, and the backing fabric.

22. A method of degassing matrix material in the manufacture of fiber-composite components, the method comprising:
introducing the matrix material to be degassed into a degassing device through a first connection;
removing the degassed matrix material out of the degassing device through a second connection; and
forming negative pressure in an interior of the degassing device through a third connection,
wherein the degassing device further comprises an inner body, a resin-impermeable and air-permeable film, and an outer housing.

* * * * *